March 3, 1942.  G. A. COLLENDER  2,275,349
LIGHT WEIGHT FLOOR CONSTRUCTION
Filed Aug. 10, 1940   2 Sheets-Sheet 2
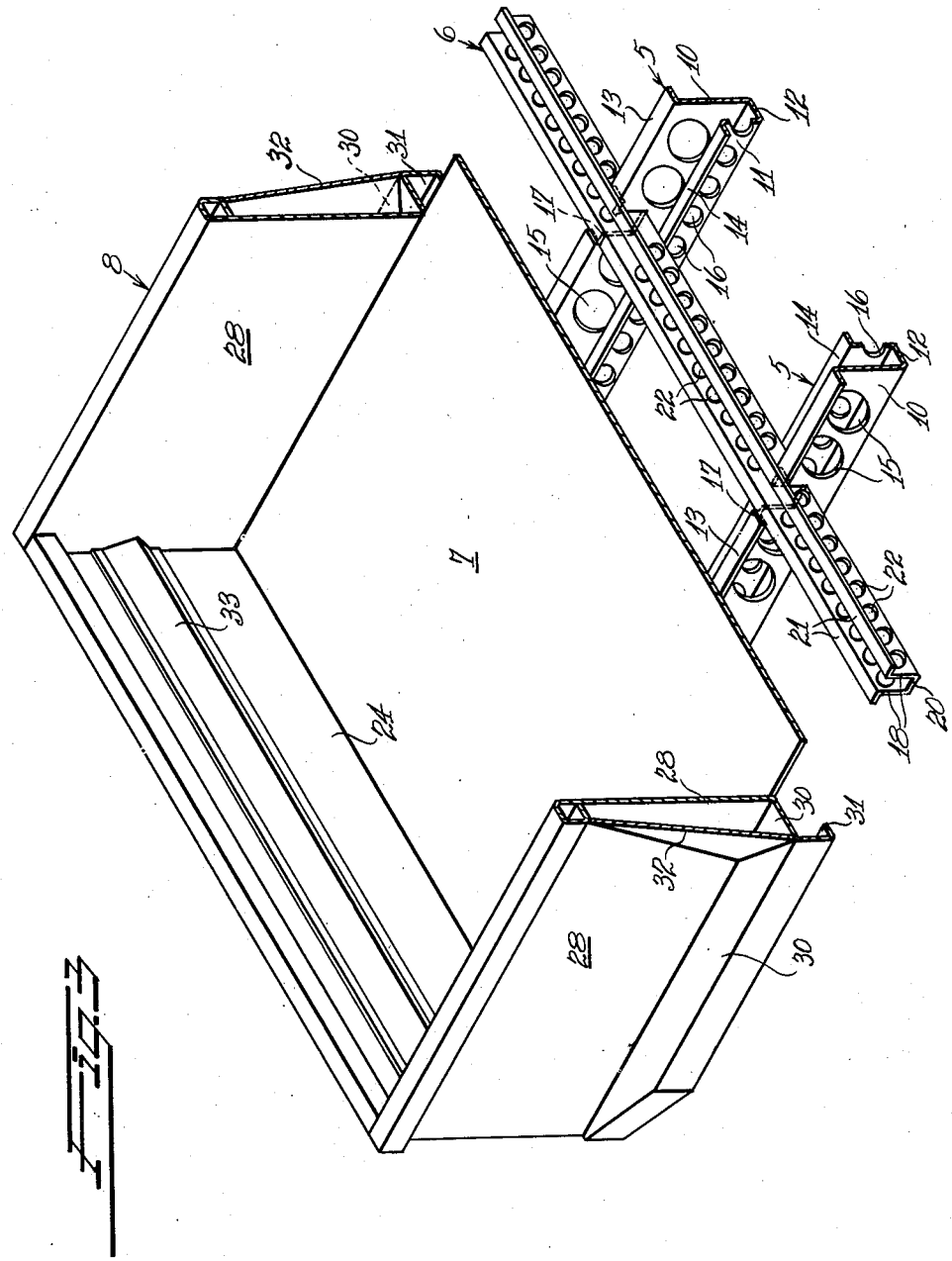
Inventor
Gustave A. Collender
By Ralph L. Stevens
Attorney Patented Mar. 3, 1942

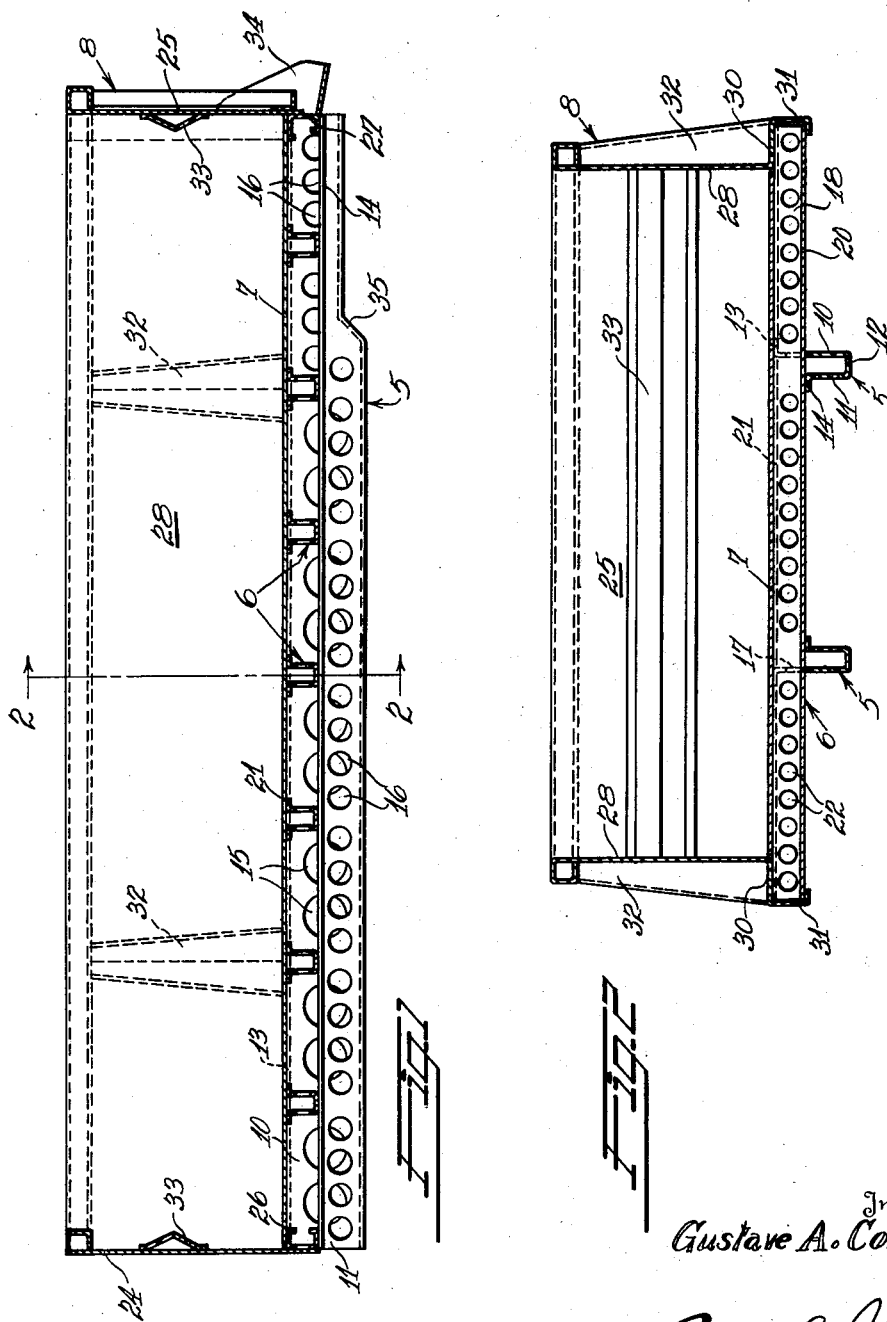

2,275,349

UNITED STATES PATENT OFFICE 2,275,349

LIGHT WEIGHT FLOOR CONSTRUCTION

Gustave A. Collender, Los Angeles, Calif., assignor to Six Wheels Inc., Los Angeles, Calif., a corporation of California Application August 10, 1940, Serial No. 352,168

7 Claims. (Cl. 296—28)

The present invention relates to an improved floor construction and especially to a novel floor-supporting structure for decreasing the amount and weight of material necessary for the complete construction.

More specifically, this invention is concerned particularly with the production of a light-weight body for use in association with the power plant and undercarriage of a vehicle designed to transport payloads. It should be understood, however, that this invention is not confined to such use but that it includes within its scope an application to various and obvious other fields. Still more specifically, the present invention is primarily the result of an endeavor to supply the market with a truck that will haul a much greater payload—comparing gross to net—than has heretofore been possible.

At this time, all truck bodies of which I am aware, including dump bodies, are supported by heavy channel iron and I-beam understructures. The understructures not only are heavy, but are so composed and disposed relative to the load-carrying floor that the latter receives insufficient and inefficient support and hence must be made of relatively great thickness. Consequently, the floor construction has been of excessively high weight and the payload has been unnecessarily low. All of this is of primary importance, particularly in those States or localities where gross vehicle weights are limited.

Accordingly, it is the primary object of the present invention to provide a floor construction wherein the substructure is such as to permit a reduction in cost and/or weight of the floor structure proper.

It is another major object of my invention to design a floor construction wherein—without increasing the weight of and in fact decreasing the weight of the flooring proper—the weight and/or cost, or both, of the supporting structure for the flooring is reduced.

It is a particular object of the present invention to equip a large, power-operated vehicle with a dump body construction of minimum weight and of increased payload.

There are many subordinate objects of the invention that could be stated here, but they should be obvious from a careful consideration of the foregoing discussion and the following detailed description when taken in conjunction with the accompanying drawings and the appended claims. In the drawings:

Fig. 1, illustrating one thoroughly tested and satisfactory embodiment of my invention, constitutes a longitudinal section taken vertically through a dump body construction built in accordance with the invention.

Fig. 2 represents a cross-section taken substantially upon the plane of line 2—2 in Fig. 1, looking in the direction of the arrows.

Fig. 3 is a view, generally in perspective, of the structure of Figs. 1 and 2, cut in two different vertical planes adjacent the front or traction end of said structure.

With continued reference to the drawings, wherein like numerals are employed to designate like parts, the disclosed construction comprises essentially a floor-supporting substructure consisting of a pair of longitudinal members, 5 carrying a plurality of cross members 6; a floor in the form of a plate 7 resting upon this substructure; and further body structure designated generally at 8 and comprising a rectangular arrangement of side and end walls that cooperate in novel and important manner with the floor and substructure as will be seen later.

Each longitudinal member 5 comprises a channel having a high vertical outer wall 10 joined integrally to a shorter inner vertical wall 11 by a bottom section 12, the two walls have integral horizontal top flanges, 13 and 14 respectively, extending from end to end. These walls also have a series of apertures, 15 and 16 respectively, so placed and of such size as to materially reduce the weight of the members without sacrifice in the strength necessary for the purpose intended. Each longitudinal member also has a series of spaced slots or notches 17, shaped to properly receive the cross members 6 in a manner presently explained, the slots of the two members 5 being disposed in alignment in pairs so that the cross members will be in parallelism when assembled.

Each cross member 6 comprises a channel formed of equal vertical side walls 18 integrally connected by a bottom section 20 and having integral, oppositely extended horizontal flanges 21. These vertical walls are apertured at 22 for weight reduction and without sacrifice in essential strength. The relative proportioning is such that the total depths of the cross members and of the slots 17 is equal, so that after assembly the bottoms of the cross channels ride upon the bottoms of the slots while the flanges 21 lie horizontally with the flanges 13 and receive vertical support from the notched portions of the vertical walls 10. Also, the height of the vertical walls 11 is such that their flanges 14 engage the bottoms 20 of the cross members after assembly.

The cross members thus are very closely interfitted with the longitudinal members and strongly supported thereby, and the rigidity may be increased by welding along the edges of the slots 17, and/or by forming a welded or riveted joint between the flanges 14 and the sections 20. Permanence likewise may be obtained by uniting the floor plate 7 to the longitudinal numbers or to some or all of the cross members, or to both. However, in the illustrated arrangement the body construction is such that the side walls can be utilized to maintain the floor in position relative to the side walls, so that the joints between the longitudinal and cross members are the only places requiring permanent attachment.

Due to the shape of the longitudinal members and to the relatively large number of cross members the substructure may be formed of light sheet steel, with numerous perforations so that its weight is very much less than that of a conventional framework designed to support the same load—and although much lighter it is about fifty per cent stronger. Moreover, the large number of points of support for the floor plate 7 and the much greater surface area of such support—all as afforded by the flanges 13 and 21—permits the floor plate to be formed of sheet material that is more than fifty per cent lighter in weight than and yet capable of carrying the same load as the heavier floor plates previously mounted on conventional substructures. For example, in a truck body of seven cubic yards capacity, the total weight reduction is approximately one thousand pounds, and this of course represents the increase in payload that the power plant and other parts of the truck can handle. This payload increase is particularly of advantage in localities where gross vehicle weights are limited.

In the preceding example, the longitudinal and cross members can be formed of 10 gauge metal, the floor likewise of 10 gauge and the remaining body structure of 12 gauge metal. These figures of course are not absolute nor relatively critical, but simply serve to illustrate that the floor is at least 2 to 3 gauges lighter than that of a prior truck body of corresponding size and that the frame material is remarkably thinner than that of the ordinary channel iron and I-beam structures heretofore used.

The only novelty in the upper body structure resides in its manner of cooperation with the floor edges and the ends of the cross members. It comprises a headboard 24 and a tailgate or tailboard 25 that fit against the ends of the floor plate and against a pair of special cross members, 26 and 27 respectively, which are set into suitable notches in the ends of the longitudinal members 5; and a pair of sideboards 28 which comprise vertical walls that are bent outwardly to form ledges 30 which directly engage the flanges 21 at the extremities of the cross members 6 and that thence are bent downwardly and inwardly to form pockets or channels 31 which rather snugly receive the outer ends of said cross members.

Since the side and end boards are suitably joined permanently, or interlocked detachably, at the corners of the body and since they abut the four edges of the floor plate, the latter is so securely confined that it may be detachably supported by the cross members 6, if desired. In fact, the entire superstructure may be removably mounted with respect to the substructure—although such type of mounting probably would not be desirable where the substructure forms a tilting framework for a dump body.

The upper edges of the side boards and the tailboard are rolled outwardly, as shown, for smoothness and reenforcement, and for the same reasons the upper edge of the headboard is rolled inwardly. Vertical strengthening elements 32, substantially triangular in horizontal section, are secured to the sideboards. Similar elements 33, horizontally arranged, are arranged to reenforce the endboards. The usual discharge chute 34 may be mounted at the rear end of the body. Also, the rear ends of the longitudinals 5 preferably are made of reduced depth at the locus 35—no novelty, however, being claimed for this.

There is of course nothing novel, broadly in the provision of weight reducing apertures, but it is thought that their particular disposition here, in members of novel form and cooperative arrangement is important and of patentable significance.

It should be understood that various changes may be made within the scope of the invention, the disclosed embodiment being illustrative rather than restrictive. It further will be appreciated that my improved floor construction can be advantageously used on railway units as well as highway vehicles, having nontiltable as well as tiltable bodies, and that in fact it may be adapted to successful use outside the field of transportation. Therefore, I wish to be limited as is customary only by a liberal interpretation of the appended claims.

What is claimed is:

1. A horizontal supporting structure of the character described comprising spaced substantially parallel primary members and a plurality of substantially parallel secondary members arranged across said primary members, the primary members being formed as upwardly open channels each having a low wall and a high wall that is provided with spaced openings the bottom edges of which are substantially at the level of the top of the low wall, and said secondary members resting upon said top of the low wall and extending through said openings.

2. In the structure defined in claim 1, the tops of said high walls having horizontal flanges, said secondary members having horizontal flanges and being of such depth that all of the mentioned flanges are in substantially one horizontal plane.

3. In the structure set forth in claim 1, said openings comprising upwardly open slots that have contours approximating the cross sectional shapes of the secondary members, at least some of the members having horizontal flanges at their extreme upper edges, the shapes and proportions of the defined elements being such that all upper edges and surfaces terminate in a common horizontal plane.

4. A construction of the character described comprising a flat horizontal member to be supported, and a substructure comprising a plurality of primary and secondary structural members, the primary members comprising channels each having a low vertical wall and a high vertical wall, the secondary members extending transversely of the primary members and resting upon said low vertical walls and having such vertical dimensions that the top edges or surfaces of all the structural members are in substantially the same plane for flush engagement with the supported flat member, said secondary members further having horizontal flanges at their upper edges, and the high walls of the primary members having horizontal flanges provided with gaps for reception of portions of the first named flanges.

5. A construction of the character described comprising a flat horizontal member to be supported, and a substructure comprising a plurality of primary and secondary structural members, the primary members comprising channels each having a low vertical wall and a high vertical wall, the secondary members extending transversely of the primary members and resting upon said low vertical walls and having such vertical dimensions that the top edges or surfaces of all the structural members are in substantially the same plane for flush engagement with the supported flat member, said secondary members further being in channel form with their upper edges flanged horizontally and extending through and beyond the high walls of the primary members, to which end the latter have vertical openings shaped to the cross sectional contour of the secondary members.

6. In a body and understructure assembly for a dumping vehicle or the like, a floor supporting structure comprising a pair of longitudinal members formed of sheet steel in the shape of upwardly open channels, each channel having a low wall and a high wall, a plurality of sheet steel cross members of channel form resting upon said low walls and extending through and beyond said high walls in such manner that the top surfaces of all the members are in a common plane, a sheet metal floor disposed upon said top surfaces, and further upright body structure associated with said floor to form a load receptacle.

7. In a supporting structure of the character described, two sets of spaced structural members arranged transversely of each other, the members of one set comprising channels each having a low wall and a high wall, substantially in parallelism, the members of the other set engaging the low walls and having a depth substantially equal to the dimensional difference between the high and low walls, and said high walls being recessed to receive portions of the members of said other set.

GUSTAVE A. COLLENDER.